United States Patent [19]

Crandall

[11] Patent Number: 5,070,448
[45] Date of Patent: Dec. 3, 1991

[54] METHOD FOR TESTING A MICROPROGRAMMED INPUT/OUTPUT INTERFACE USING STEAL TECHNIQUES

[75] Inventor: Donald R. Crandall, Boca Raton, Fla.

[73] Assignee: International Business Machines Coproration, Armonk, N.Y.

[21] Appl. No.: 830,891

[22] Filed: Dec. 9, 1985

Related U.S. Application Data

[63] Continuation of Ser. No. 448,099, Dec. 9, 1982, abandoned.

[51] Int. Cl.[5] .................. G06F 11/00; G06F 11/30
[52] U.S. Cl. .................. 395/575; 364/221; 364/221.7; 364/231.2; 364/234; 364/238.2; 364/238.3; 364/260; 364/264; 364/264.2; 364/266; 364/267; 364/267.2; 364/267.5; 364/267.6; 364/271.7; 364/DIG. 1
[58] Field of Search ... 364/900 MS File, 200 MS File, 364/300 MS File; 371/15, 16, 25, 26, 29

[56] References Cited

U.S. PATENT DOCUMENTS

| | | | |
|---|---|---|---|
| 3,324,458 | 6/1967 | MacArthur | 364/200 |
| 3,806,878 | 4/1974 | Edstrom | 364/200 |
| 3,831,148 | 8/1974 | Greenwald et al. | 371/29 X |
| 3,838,400 | 9/1974 | Meadows et al. | 364/900 |
| 3,916,177 | 10/1975 | Greenwald | 371/29 |
| 3,927,310 | 12/1975 | D'Anna et al. | 371/29 |
| 3,940,744 | 2/1976 | Mock et al. | 364/200 |
| 3,987,420 | 10/1976 | Badagnani | 371/17 X |
| 4,023,142 | 5/1977 | Woessner | 364/200 |
| 4,028,536 | 2/1976 | Woodward | 371/15 |
| 4,034,194 | 7/1977 | Thomas et al. | 235/153 |
| 4,041,455 | 8/1977 | Norberg | 371/29 X |
| 4,047,158 | 9/1977 | Jennings | 364/900 |
| 4,159,534 | 6/1979 | Getson, Jr. et al. | 364/200 |
| 4,167,779 | 9/1979 | Sullivan et al. | 364/200 |
| 4,212,059 | 7/1980 | Sato et al. | 364/200 |
| 4,231,087 | 10/1980 | Hunsberger et al. | 364/200 |
| 4,280,285 | 7/1981 | Haas | 434/30 |
| 4,315,313 | 2/1982 | Armstrong et al. | 364/200 |
| 4,371,932 | 1/1983 | Dinwiddie, Jr. et al. | 364/200 |
| 4,417,304 | 11/1983 | Dinwiddie, Jr. | 364/200 |
| 4,456,994 | 6/1984 | Segarra | 371/16 |
| 4,479,179 | 10/1984 | Dinwiddie, Jr. | 364/200 |
| 4,484,329 | 11/1984 | Slamka et al. | 371/25 |

OTHER PUBLICATIONS

A. J. Heimsoth et al., "On-Line" Error & Statistics Logging in Large Data Base Systems, IBM Technical Disclosure Bulletin (vol. 19, No. 8), Jan. 1977, pp. 2874–2876.
R. E. Birney et al., Save Storage Address on Error Class Interupts, IBM Technical Disclosure Bulletin (vol. 19, No. 11), Apr. 1977, pp. 4062–4068.
IBM Series / 1–4955 Processor and Processor Features Description, Oct. 15, 1979.

Primary Examiner—Thomas C. Lee
Assistant Examiner—Robert B. Harrell

[57] ABSTRACT

A method for testing an I/O controller (20) associated with a host processor (10) without the need of a special purpose hardware console. At the start of the procedure, a test program is loaded into the random access memory (24) of the I/O controller (20) through the host processor (10) on a cycle stealing basis. Then, an area of the main storage unit (11) of the host processor (10) is cleared for communicating data to the I/O controller (20), again on a cycle stealing basis, for instructing what operations from the test program are to be utilized and to supply data for use in the selected portion of the test program. With this procedure, data can be altered in the random access memory (24), data from the I/O controller (20) displayed on the operator console (13) of the host processor (10) and data on the channel (26) from an I/O device (30) examined without having to greatly disturb the operations of the host processor (10).

11 Claims, 6 Drawing Sheets

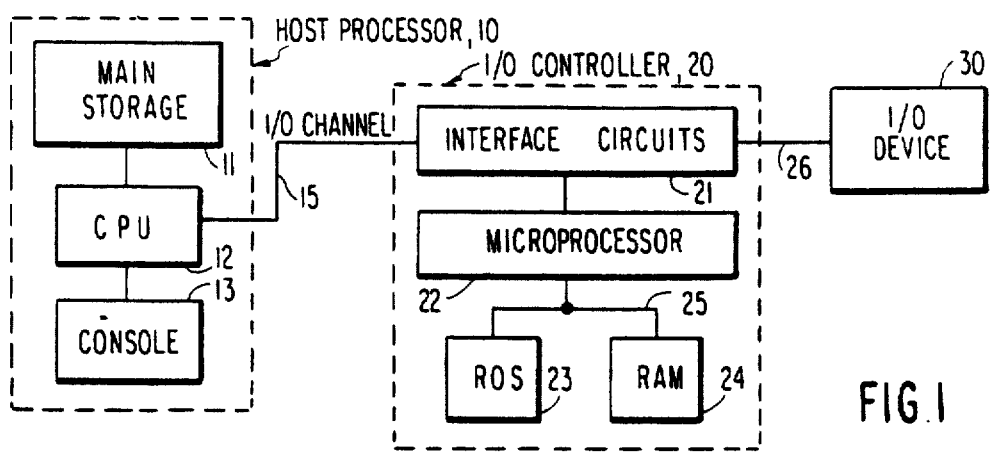
FIG.1
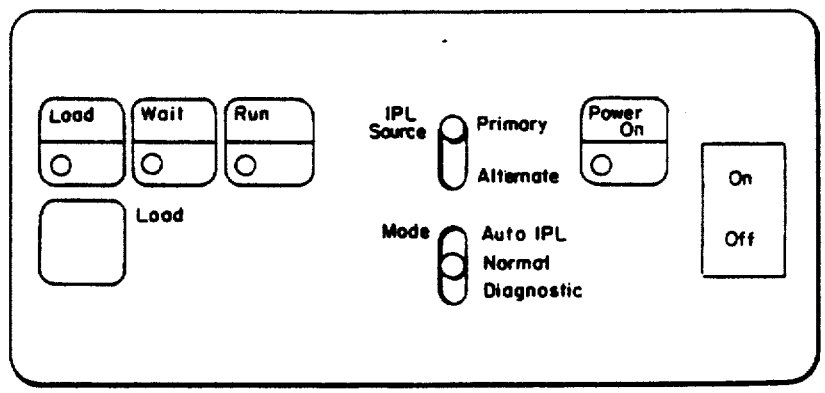
FIG.2
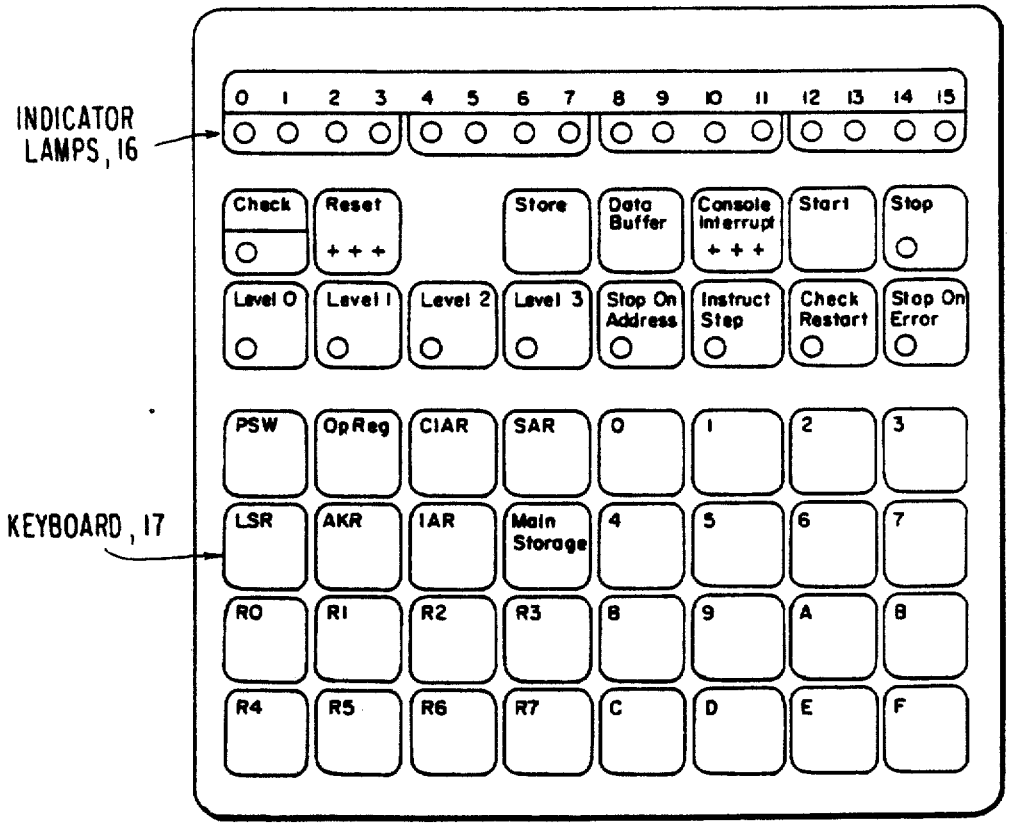

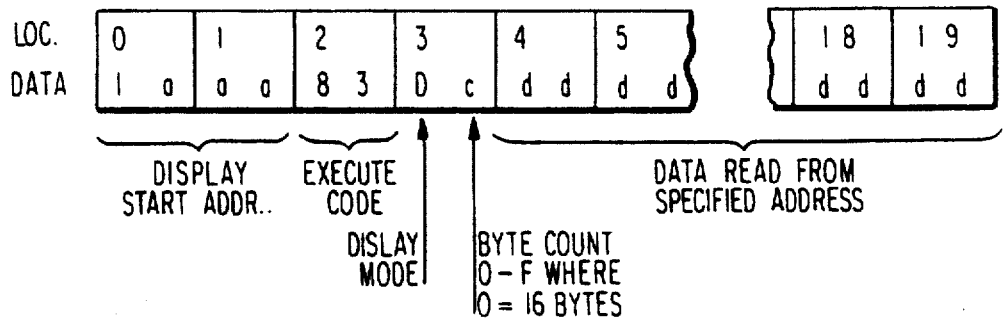
FIG.8A DISPLAY ROS OR RAM CONTENTS
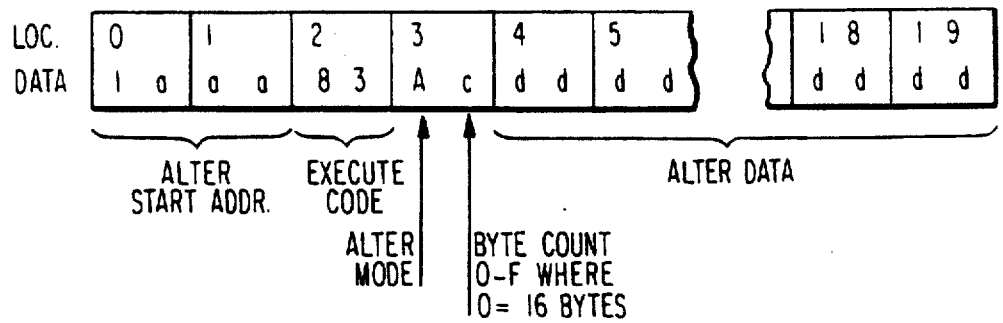
FIG.8B ALTER RAM CONTENTS
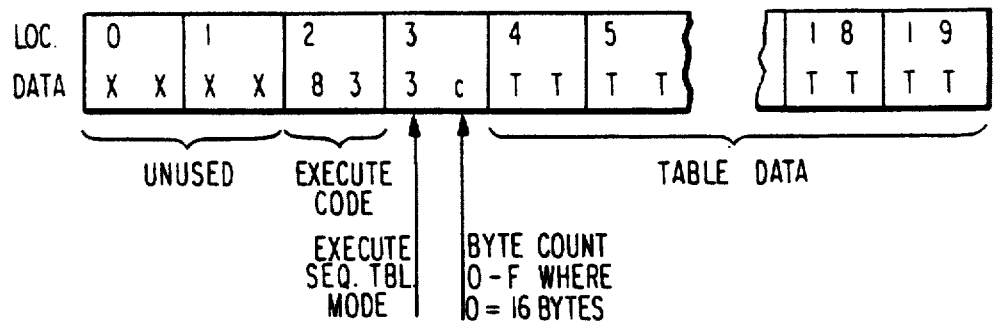
FIG.8C EXECUTE SEQUENCE TABLE
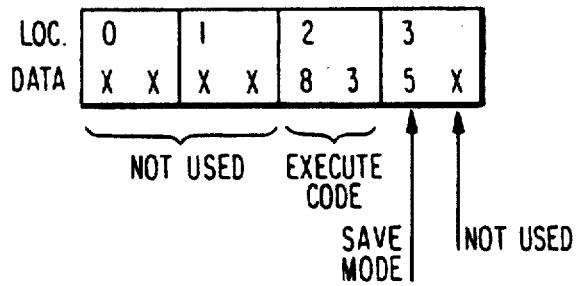
FIG.8D SAVE SERIES/1 STORAGE LOCATION 0000 TO 0019
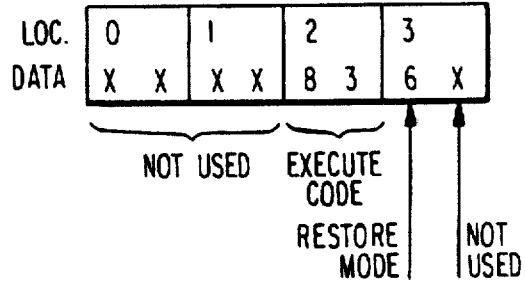
FIG.8E RESTORE SERIES/1 STORAGE LOCATION 0000 TO 0019

METHOD FOR TESTING A MICROPROGRAMMED INPUT/OUTPUT INTERFACE USING STEAL TECHNIQUES

This is a continuation application of Ser. No. 448,099, filed on Dec. 9, 1982 now abandoned.

TECHNICAL FIELD

The invention pertains to a method for testing the operation of a microprogrammed I/O attachment used to interface an I/O device, such as a disc memory or a display terminal, to a host processor.

BACKGROUND ART

An example of a suitable host processor is the IBM (International Business Machines Corporation) Series/1 processor, and an example of a suitable I/O controller is an IBM Type 4966 I/O controller, which is particularly adapted for use with the Series/1 processor. An example of a system such as that shown in FIG. 1 is described in more detail in commonly assigned U.S. Pat. No. 4,426,637 to Brown et al.

FIG. 1 is a block diagram showing a data processing installation where the present invention can be used to advantage. The system includes a host processor 10 composed of a main storage unit 11, a central processing unit (CPU) 12 and a console 13. The I/O controller 20 is provided to interface the host processor 10 with an I/O device 30. The I/O controller 20 includes interface circuits 21 which connect the I/O controller channel 15 from the host processor 10 to the I/O device 30, a microprocessor 22 which controls the operations of the interface circuits 21, and two memories which the microprocessor 22 requires for performing its control operations. The two memories are a read-only storage (ROS) 23 and a random access memory (RAM) 24, both of which are communicated with the microprocessor 22 via a bus 25.

It is often required to test the functioning of the I/O controller and the I/O device 30, either to verify their operation during the manufacture of the system or to diagnose problems in the field. To carry out such testing, it is desired to be able to examine the contents of the ROS 23 and RAM 24, to alter the contents of the RAM, and to display designated segments of data, particularly, data communicated from the I/O device 30. In the prior art, it has been the practice to connect to the I/O controller via the I/O channel 15 a separate test device which is called an "I/O attachment console". An example of such an arrangement is described in commonly assigned U.S. Pat. No. 4,268,902 to Berglund et al.

Although test installations such as that described in the Berglund et al. patent were capable of testing the desired functions of the I/O controller, nevertheless, they were disadvantageous for several reasons. First, it was time consuming to set up the test installation in that the covers of various system units had to be removed and cables disconnected and reconnected through the test device. The operations of the entire data processing system had to be shut down while this was taking place. Moreover, the presence of the test device itself could contribute to the problem being diagnosed, for instance, if the problem were due to electromagnetic interference. This made it very difficult to pinpoint the source of a problem in many instances.

IBM Technical Disclosure Bulletin, Vol. 19, No. 10, March 1977, authored by D. C. Solly, describes debugging user programs for use with a "console-less" controller. Although such programs could allow for some testing of the I/O controller without the need for an I/O attachment console, they are not fully acceptable in many situations due to the fact that the user's software program had to be modified greatly to accommodate the debugging programs.

Overcoming these disadvantages, the present invention provides a method for testing predetermined functions of an I/O controller in which it is not necessary to greatly disturb the ordinary processing operations of the data processing system of which the I/O controller to be tested forms a part. Particularly, the invention provides such a method in which it is not necessary to disconnect any of the cables of the data processing system and to connect in an I/O attachment console.

Further, the present invention provides such a method for testing an I/O controller in which it is not necessary to modify any of the user's software, and wherein the data processing system can continue its ordinary data processing operations after the testing of the I/O controller has been carried out.

SUMMARY OF THE INVENTION

In the method of the invention, for testing an I/O controller which interfaces a host processor and an I/O device, a test program is first loaded through the host processor into the RAM of the I/O controller. This program loading is done on a "cycle steal" basis so that the operations of the host processor are not greatly disturbed. Data stored in a predetermined segment of the main storage of the host processor is cleared from that segment and saved by transferring it to the RAM of the I/O controller. The cleared segment of the main storage is then used by the testing user to communicate commands and data to the I/O controller for testing purposes.

During the actual testing of the I/O controller, the user can input instructions and data into the predetermined segment of the main storage through the operator's console which ordinarily forms a part of the host processor unit. These instructions and data are communicated to the I/O controller on a cycle steal basis using the program which was transferred into the I/O controller at the beginning of the test procedure. These instructions provide the capability of either transferring data into designated locations in the RAM of the I/O controller, for example, to correct programming problems, or transferring data which is stored in the RAM of the I/O controller back to the host processor for display upon the console of the host processor so that the contents of the RAM can be examined. Data from the ROS of the I/O controller can be transferred and displayed in a similar manner.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 1 is a block diagram of a data processing system with which the invention can be used to advantage;

FIG. 2 is a front view of a console unit of a host processor shown in FIG. 1;

FIGS. 8A-8E show formats of control words used during testing.

DESCRIPTION OF THE PREFERRED EMBODIMENT

Figure 3:
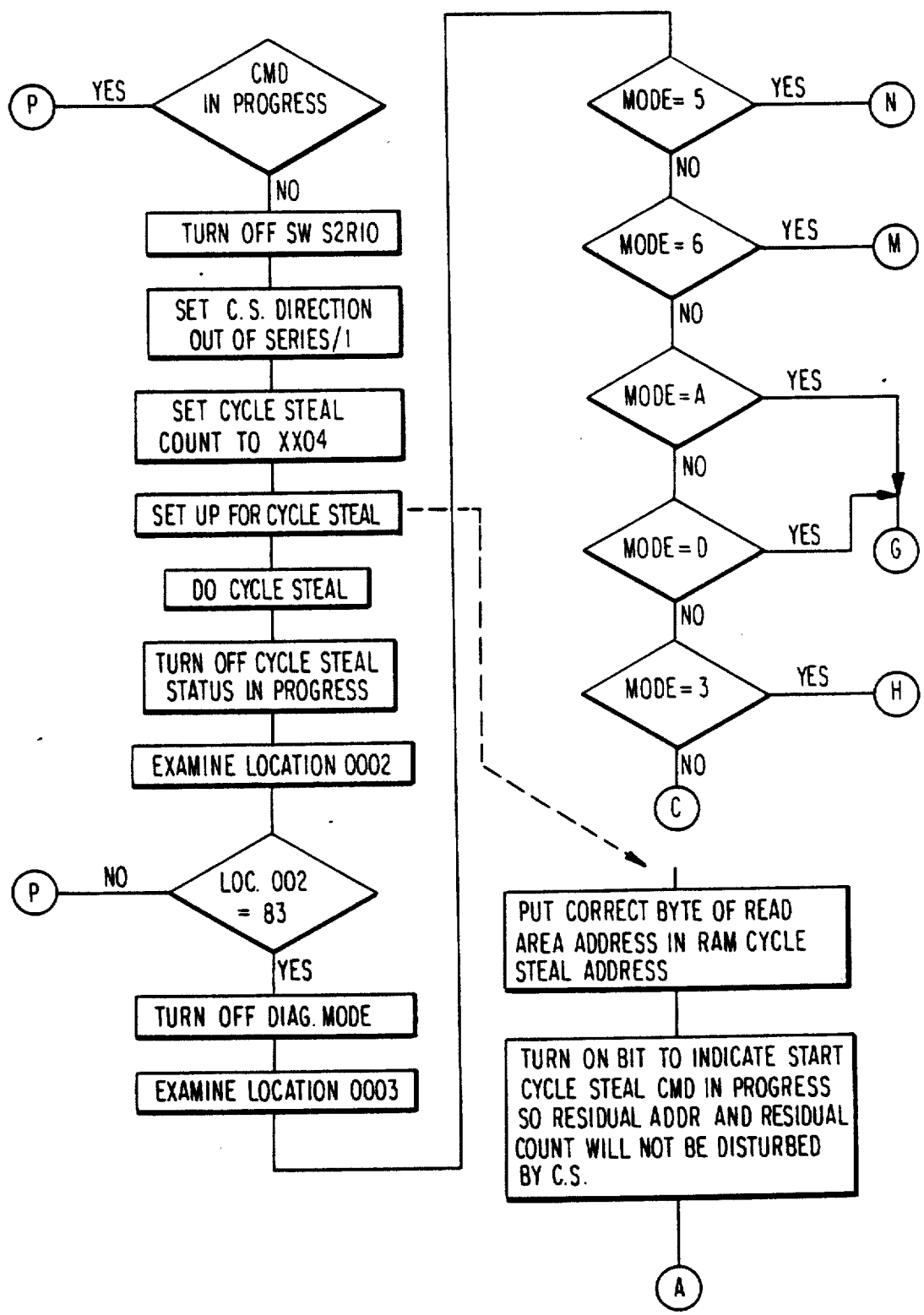
FIGS. 3-6 are a series of flow charts used to describe a test program which is resident in the RAM of the I/O controller during a test procedure.

FIG. 2 shows a front view of the console panel 13 of the host processor 10 for the example of the Series/1 processor mentioned above. The console 13 includes sixteen indicator lamps 16 grouped into sets of four for displaying simultaneously two bytes of data of eight bits each. Also included is a keyboard 17 composed of sixteen data entry push buttons, one push button for each "digit" in hexadecimal notation. The console further includes operational control switches and buttons including START, STOP, RESET, etc. and switches used for controlling the loading of programs. For a detailed discussion of the usage and operations of each of the switches and buttons on this console panel, reference may be made to the Series/1 User's Manual (IBM order No. GA34-0021-3) and to U.S. Pat. No. 4,038,642.

To commence testing of an I/O controller using the method of the invention, it is first necessary to load into the RAM 24 of the I/O controller 20 a test program. This can easily be accomplished by using the "IPL Load" capability of the Series/1 processor. The program which is to be loaded into the RAM 24 is illustrated in FIGS. 3-6 and will be discussed in detail below. After loading the test program into the RAM 24, it is necessary to clear a predetermined number of bytes of the main storage 11 of the host processor 10 for use in transferring instructions and data to the RAM 24 and for receiving data from the RAM 24 and the ROS 23 for display upon the indicator lamps 16 for diagnosis by the testing user. In the example herein described, it is assumed that data from locations 0004 through 0019 of the main storage 10 is transferred into the RAM 24 where it is served for return to the main storage 11 at the completion of the test procedure. The data from locations 0000 through 0003 must be saved manually for reasons discussed below.

After the test program has been loaded into the RAM 24 and the first 20 bytes of the main storage 11 saved, the actual testing of the I/O controller 20 can commence. This testing is carried out, as mentioned above, using the cleared first 20 locations of the main storage 11. As illustrated in FIG. 8, the first two word locations (0000 and 0001) in the main storage are used to indicate an address in either the ROS 23 or the RAM 24, the second and third locations (0002 and 0003) are used to hold an execute code, and the remaining 16 locations are used for storing data, for example, to be transferred into the RAM 24 at locations specified by the ROS/RAM address from the first two locations. In this example, it is assumed that the execute code is "83". This number has been selected since it will not interfere with any of the normal functions of the Series/1 processor. However, other values can be used if desired.

Built into the 4966 I/O attachment is a service loop routine in which the I/O controller periodically, on a cycle steal basis, examines the content of the main storage location 0002 and 0003. If the I/O controller sees the code "83" at any time during passage through the service loop, it executes the particular test operations specified by the data field.

Examples of data formats for memory locations 0000 through 0019 for five different test modes now be discussed with reference to FIGS. 8A through 8E.

FIG. 8A shows the content of main storage location 0000 through 0019 for the Display ROS or RAM content mode (hereinafter simply the "Display" mode). In this case, main storage locations 0000 and 0001 (abbreviated in the drawings as "0" and "1" for convenience) store the start address in the ROS 23 or the RAM 24 of the data which is to be transferred to the host processor and displayed upon the indicator lamps 16. The execute code "83" is placed in location 0002. The first of the two nibbles of location 0003 is set to hexadecimal "D" to indicate the Display mode. The second nibble of location 0003 contains the byte count, that is, the number of bytes, beginning from the start address specified in locations 0000 and 0001, which are to be read out from the ROS 23 or RAM 24. The byte count may be any value from hexadecimal "0" (specifying 16 bytes) to hexadecimal "F" (15 bytes). Main storage location 0004 through 0019, or as many of them as are necessary if a byte count of less than 16 is chosen, will contain the data read from the specified addresses after execution of the procedures.

In the case of the Alter RAM Contents mode (hereinafter simply the "Alter" mode), as shown in FIG. 8B, main storage locations 0000 and 0001 are set to the start address in the RAM at which alteration of data is to take place. However, it should be noted that the inputting of the execute code "83" should not be performed until the data for all of the other ones of locations 0000 through 0019 have been entered. The reason for doing this is that as soon as the I/O controller sees the "83" it will commence with a test routine. The first nibble of location 0003 is set to hexadecimal "A" to indicate the Alter mode. The second nibble of main storage location 0003 contains the byte count, the number of bytes of the RAM 24 to be altered. As in the case of FIG. 8A, the number of bytes may range from hexadecimal "0" to hexadecimal "F", where hexadecimal "0" indicates 16 bytes. Locations 0004 through 0019, or as many of them as are necessary, are filled with the altered data to be read into the specified locations in the RAM 24.

FIG. 8C illustrates the main storage content for the case of the Execute Sequence Table mode (hereinafter simply the "Table" mode). This mode is used for performing autoloader commands, and for setting, in the case that the I/O device 30 is a disc memory unit, the memory "pointer" to a designated cylinder, head and sector. In this case, main storage locations 0000 and 0001 are unused. The first nibble of location 0003 is set to "3" to indicate the Execute Sequence Table mode. The second nibble of location 0003 contains, similar to the above-described two cases, the byte count. Locations 0004 through 0019 contain table data specifying where the memory "pointer" is to be set.

FIGS. 8D and 8E respectively indicate the main storage content for modes for saving the data from locations 0000 to 0019 and for returning it to main storage. In the former case, the "Save" mode, the first nibble of location 003 is set to "5" and in the latter case, the "Restore" mode, to "6".

The execution of the test operations in each of the above-mentioned modes will now be described in further detail with reference to the flow charts of FIGS. 3-6. Referring first to FIG. 3, the I/O controller first determines whether the execution of a command is in progress. If YES, the program branches to point P (FIG. 6) and returns to the main program. If NO, for the specific example of the 4966 attachment, a switch S2R10 is turned off to turn off the Table mode. Next, the cycle steal is set in the direction out of the Series/1 host processor, after which the cycle steal count is set to XXX4 (where X indicates "do not care"). A set-up operation for a cycle steal operation is then performed.

Referring to the small chart at the lower right-hand side of FIG. 3, this operation will be described in more detail. First, the correct byte of the read area address is put into the RAM cycle steal address. The appropriate bit is then turned on to indicate that a start cycle steal command is in progress so that the residual address and residual count will not be disturbed by the cycle steal operation. Following the chart to point A in FIG. g, the Series/1 cycle steal address is set to 0000 and the first byte of the cycle steal count is set to 00. The storage key is set to 00. The first byte of the read area or save area address is then placed in the RAM cycle steal address. The procedure then returns to FIG. 3, and the cycle steal operation is performed. At the completion of the cycle steal operation, the cycle steal status bit is reset.

The I/O processor 20 is then ready to examine what is stored in location 0002 in the main storage and to determine whether the value "83" is then present. If "83" is not present, then the procedure loops back to point P and continues in the manner already discussed. If "83" is present, the I/O processor 20 is taken out of the diagnostic mode and location 0003 of the main storage is examined to determine the mode to be employed. If the first byte of location 0003 contains "5", the contents of locations 0000 through 0019 from the main storage are transferred to the RAM 24 where they are saved. (It is to be noted that since locations 0000 through 0003 are needed for implementing this operation, it will be necessary for the user to manually determine the contents of these two locations, write them down, and at the end of the test procedure, input the data thus manually saved.) If the Save mode has been selected, the procedure branches to N in FIG. 6. In the Save mode, the save area address is taken as the RAM cycle steal address and the byte count is set to 19 (20 bytes). After going through the cycle steal procedure in the manner indicated in FIG. 3, a determination is made as to whether the Execute Table mode is to be carried out. If YES, a return is made to the main code, while if the result is NO, a decision is then made as to whether or not a Restore mode operation is to be executed. If the answer to this decision is YES, a return is again made to main code, while if NO, location 0002 in the main storage is again examined on a cycle steal basis to determine whether "83" is stored therein. If NO, a return is again made to main code. If YES, operations proceed to point C and continue in a manner to be explained below.

Referring back to FIG. 3, if the first byte of location 0003 not "5", a determination is made of whether or not the first byte of location 0003 is "6". If YES, the operation proceeds to point M in FIG. 6. In the Restore mode, the cycle steal direction is set in the direction of the Series/1 from the RAM 24. "00" is then placed over the "83" in location 002. Then, the operation loops back to point N discussed above.

Figure 4:
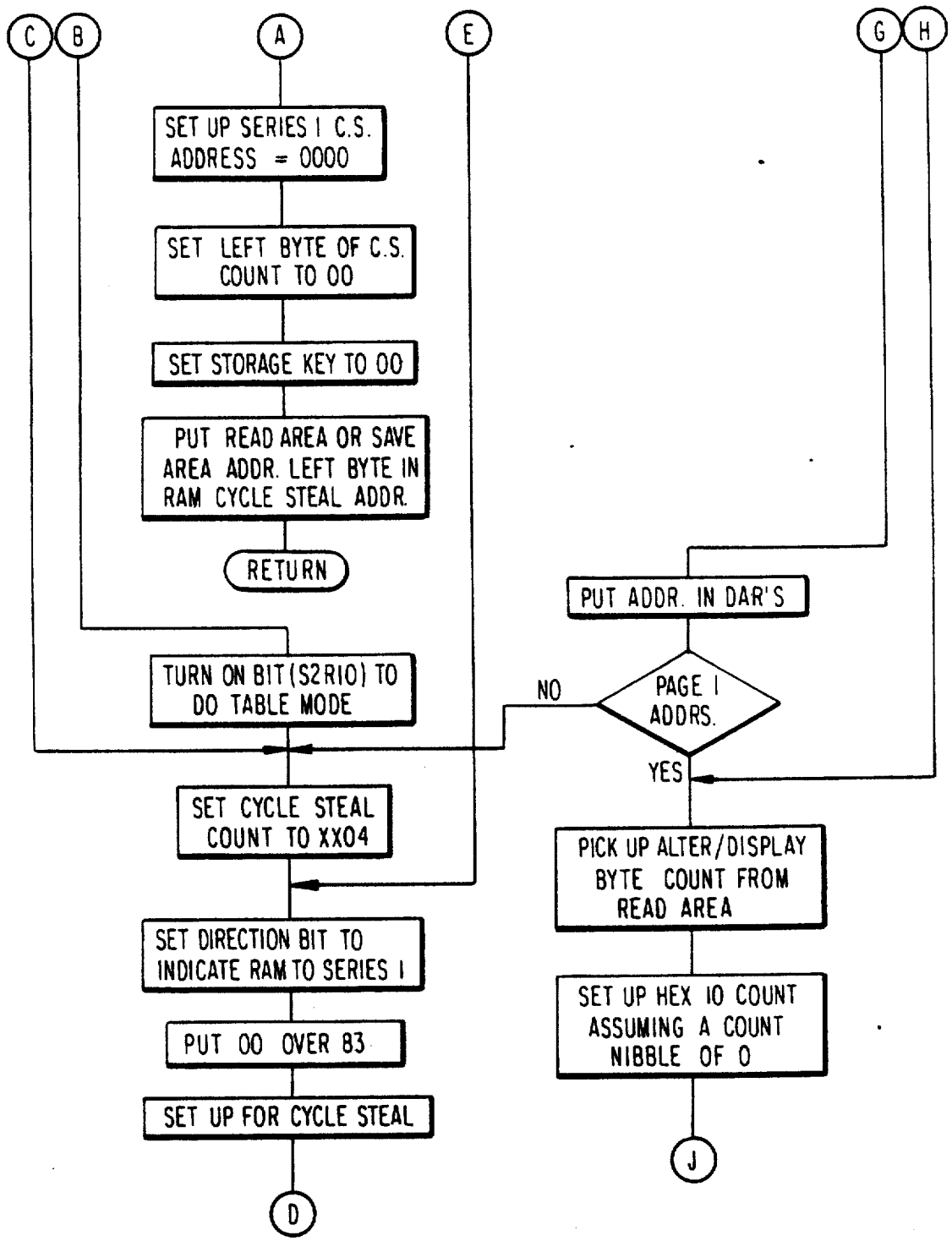

If the first byte of location 0003 is not "5" or "6", a determination is made of whether or not the Alter mode has been chosen by determining whether or not the first byte of location 0003 is "A". If YES, the operation branches to point G (FIG. 4). In this case, the address from locations 0000 and 0001 is put into the data address register of the microprocessor 22. A determination is then made as to whether or not the address received is a "Page 1" address of the I/O controller. If NO, the operation branches to point C. If YES, the alter byte count (the "count nibble") from the second byte of main storage location 0003 is picked up and examined. If the value of the alter count is 0 (corresponding to an actual count of 16, the count is set to hexadecimal 10.

Branching to point J (FIG. 5), the alter count is moved to DAR (Data Address Register) number 3. After the count has been appropriately set to take into account the fact that 0 represents an actual count of 16, a value of four is added to the byte count. The result is stored in the second (right) byte of the cycle steal count. The auxiliary data address registers are then selected and the console read area address is set therein. The main DARs are then selected. Since the Display mode is not then selected, the cycle steal direction is set to be from the Series/1 to the RAM 24. The cycle steal procedure is then carried out in the manner described above, specifically, the cycle steal operation is used to move the data specified in locations 0004 through 0019 from the main storage into the RAM 24.

When this has been completed, the cycle steal status bit is set to the off state. Since the Table mode is not selected in the Alter mode, branching to point K (FIG. 6), the alter/display address is set in the DARs, and the auxiliary DARs are selected. Patch data is picked up from the read area of main storage. The main DARs are selected, and the patch data is stored therein at the selected address. Next, one is subtracted from the byte count. If the end of the byte count has not been reached, the process loops back as indicated. If it has been reached, the operation moves again to point C (FIG. 4).

Figure 5:
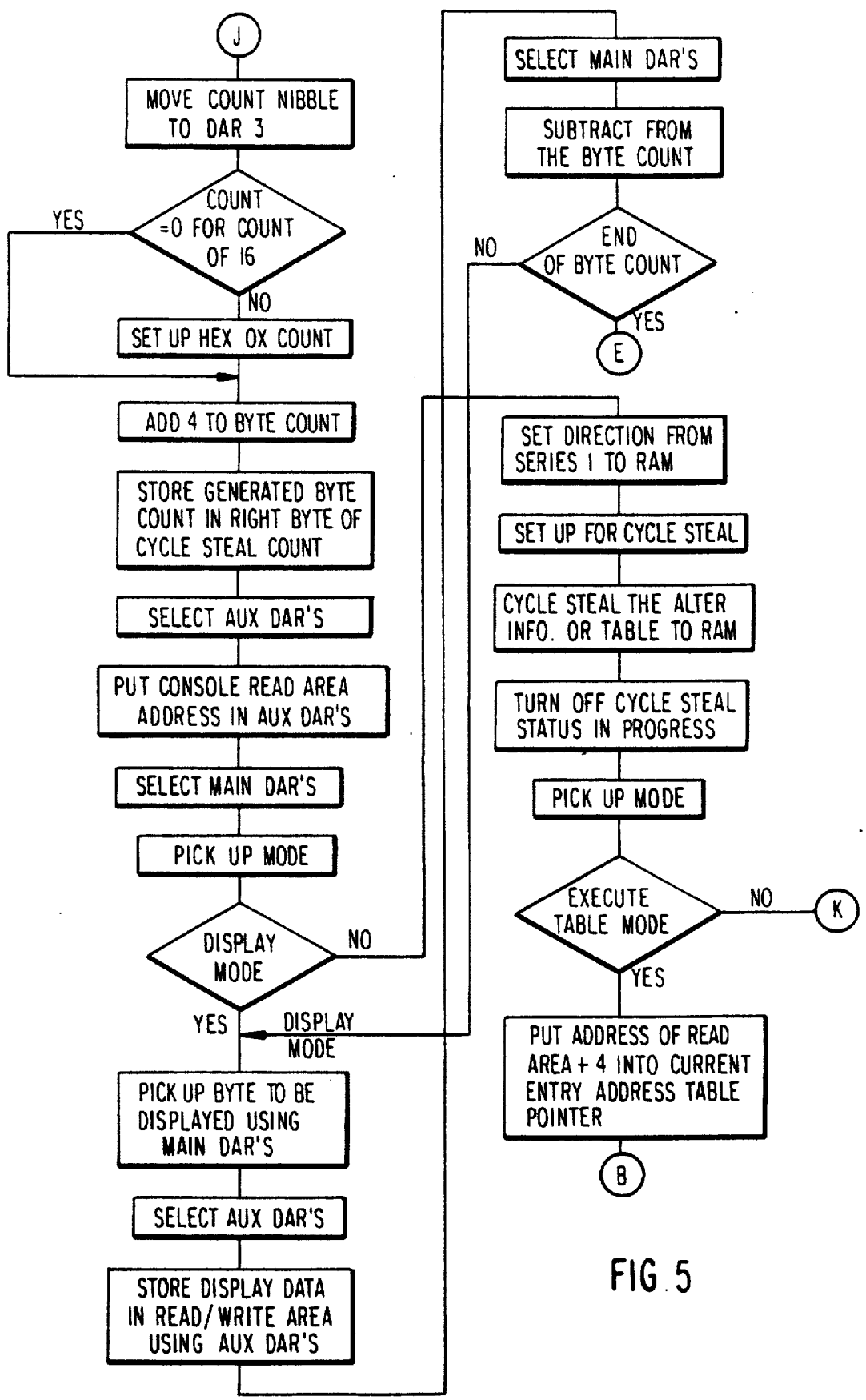
Figures 6, 7:
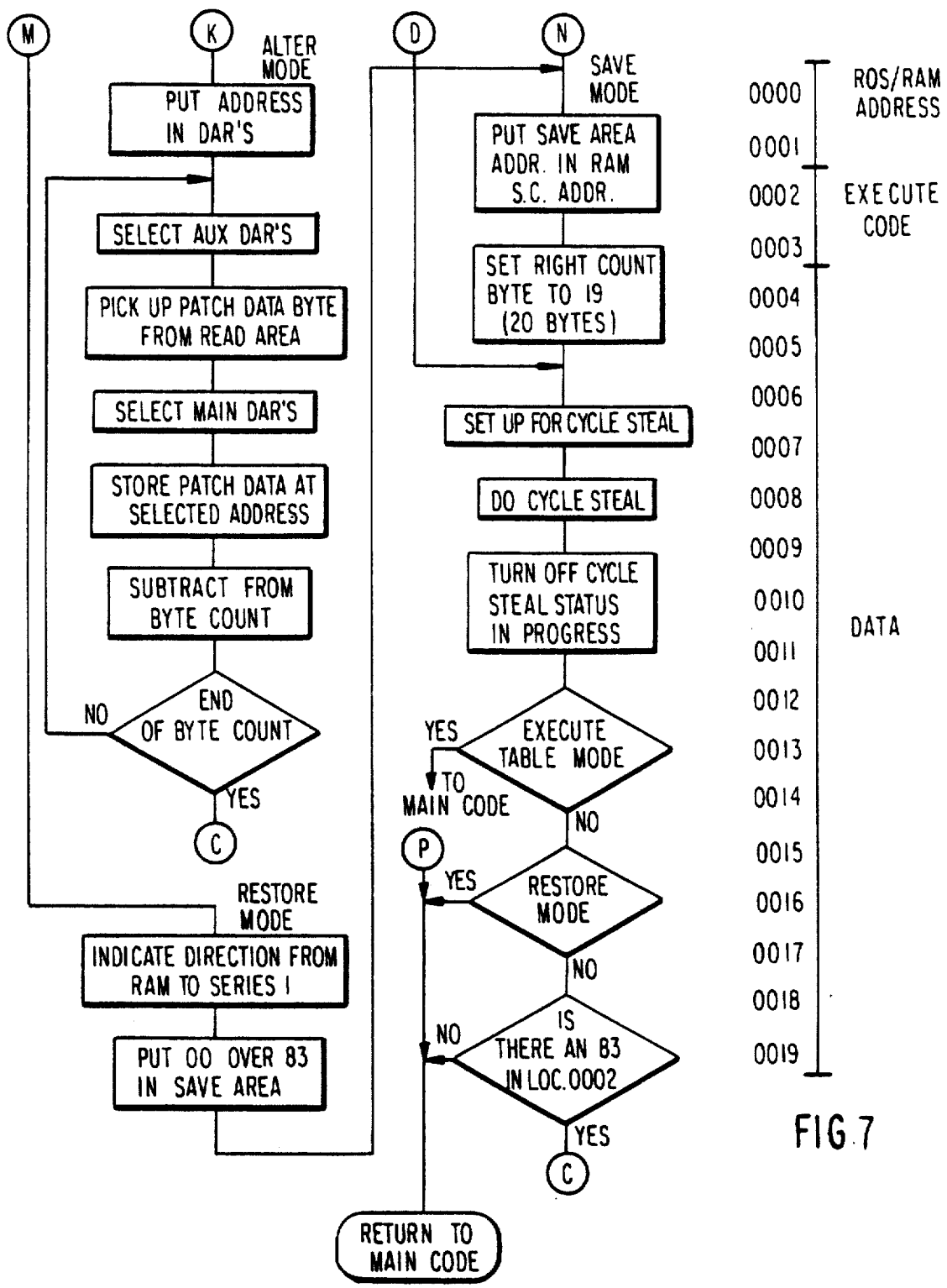
FIG. 7 is a diagram showing the organization of a segment of the main storage of the host processor during testing.

Returning to FIG. 3, if the Alter mode is not selected but the Display mode is selected, the operation again branches to point G (FIG. 4). In this case, the operation proceeds in a manner similar to that in the Alter mode. However, when the Display mode decision box shown in FIG. 5 is reached, the result of the decision will be YES. In this case, a byte to be displayed is picked up and stored in the main DARs. The auxiliary DARs are selected and the display data stored in the read/write areas thereof. The main DARs are then selected, and one is subtracted from the byte count. If the end of the byte count has been reached, the operation loops back to point E (FIG. 4). If not, the operation loops back to the YES side of the Display mode decision box.

Referring back to FIG. 3, if none of the Save, Restore, Alter or Display modes have been selected but the Table mode has been selected, the operation goes to point H (FIG. 4). The byte count is picked up from location 0003, and, as described above, hexadecimal 10 is used for the count if location 0003 contains 0 (representing an actual count of 16). The operation then goes to point J (FIG. 5). When the Table mode decision box is reached, the operation will proceed to the next box and the address of the read area plus a value of four is set into the current entry address table pointer of the microprocessor. Returning to point B (FIG. 4) bit S2R10 is then turned on to indicate the execution of the Table mode. The remainder of the procedure then continues in the manner previously described.

The flow charts of FIGS. 3 through 6 and the programs that they describe are, as mentioned above, specifically for use with an IBM Corporation Series/1 data processor and an 4966 attachment. However, one of ordinary skill in the art can easily adapt the described programs to another appropriate data processing system.

While there has been described what is at present considered to be the preferred embodiment of the invention, it will be obvious to those of ordinary skill in the art that various changes and modifications may be made therein without departing from the invention, and it is, therefore, intended to cover all such changes and modifications as fall within the true spirit and scope of the invention.

I claim:

1. A method for interfacing with operations of an I/O controller of a data processing system including a host processor and said I/O controller, comprising at said host processor using an electronic device to perform the steps of:
    loading a program for interrogation and testing into a random access memory of said I/O controller through said host processor on a cycle steal basis;
    clearing a predetermined portion of a main storage unit in said host processor;
    inputting through a console of said host processor into said predetermined portion of said main storage unit, information comprising data and/or instructions for use by said program; and
    cycle stealing, on a cycle steal basis controlled by said program in said I/O controller, information from said predetermined portion of said main storage unit of said host processor to said random access memory of said I/O controller;
    wherein such steps of interfacing with said I/O controller occur without employing any test device externally attached to said data processing system.

2. The method of claim 1, further comprising the step of making data from said random access memory of said I/O controller to said predetermined portion of said main storage unit of said host processor on a cycle steal basis under control of said program.

3. The method of claim 2, further comprising the step of displaying on indicator lamps of said console of said host processor said data transferred to said predetermined portion of said main storage unit.

4. The method of claim 2, wherein said data moved from said random access memory to said predetermined portion said main storage unit is of table data received from a memory unit coupled by said I/O controller to said host processor.

5. The method of claim 1, wherein said step of providing said information in said predetermined portion of said main storage unit of said host processor comprises inputting through said console of said host processor an address of said random access memory and data for storage in said random access memory of said I/O controller.

6. The method of claim 1, further comprising the step of changing data previously stored in said random access memory with data moved to said random access memory from said predetermined portion of said main storage unit.

7. The method of claim 1, further comprising the step of moving data from a read only storage of said I/O controller to said predetermined portion of said main storage unit of said host processor on a cycle steal basis under control of said testing program.

8. The method of claim 1, wherein said step of inputting said information through said console of said host processor comprises inputting an execute code after all other information has been inputted.

9. The method of claim 8, further comprising the step of said I/O controller periodically determining whether or not said execute code is present, only if said execute code is present, continuing with said step of cycle stealing said information from said predetermined portion of said main storage unit.

10. The method of claim 1, further comprising the step of, returning to said main storage unit of said host processor data cleared from said predetermined portion after testing of said I/O controller has been completed.

11. The method of claim 10, wherein said step of clearing said predetermined portion of said main storage comprises transferring at least a portion of data stored in said predetermined portion to said random access memory of said I/O controller, and wherein said step of returning said data comprises transferring said data to said main storage.

* * * * *